(12) United States Patent
Slater et al.

(10) Patent No.: US 10,904,421 B2
(45) Date of Patent: *Jan. 26, 2021

(54) METHOD AND SYSTEM FOR GENERATION OF IMAGES BASED ON BIORHYTHMS

(71) Applicant: Kristin Blume Slater, St. Louis, MO (US)

(72) Inventors: Kristin Blume Slater, St. Louis, MO (US); Fred S. Wolflink, Boston, MA (US)

(73) Assignee: Kristin Blume Slater, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/745,801

(22) Filed: Jan. 17, 2020

(65) Prior Publication Data

US 2020/0154021 A1    May 14, 2020

Related U.S. Application Data

(63) Continuation of application No. 14/996,675, filed on Jan. 15, 2016, now Pat. No. 10,554,871, which is a continuation of application No. 13/815,321, filed on Feb. 20, 2013, now Pat. No. 9,270,877.

(51) Int. Cl.
   *H04N 5/232*    (2006.01)
(52) U.S. Cl.
   CPC .................................. *H04N 5/232* (2013.01)
(58) Field of Classification Search
   CPC ....................................................... H04N 5/232

USPC .......................................................... 348/77
See application file for complete search history.

(56) References Cited

U.S. PATENT DOCUMENTS

| | | | |
|---|---|---|---|
| 6,095,984 | A | 8/2000 | Amano et al. |
| 6,126,595 | A | 10/2000 | Amano et al. |
| 6,563,532 | B1 | 5/2003 | Strub et al. |
| 7,280,041 | B2 | 10/2007 | Ryou |
| 2008/0204555 | A1 | 8/2008 | Hughes |
| 2012/0249797 | A1 | 10/2012 | Haddick et al. |
| 2016/0155310 | A1 | 6/2016 | Joao et al. |

FOREIGN PATENT DOCUMENTS

| | | |
|---|---|---|
| KR | 20090031075 A | 3/2009 |
| KR | 101090086 B1 | 12/2011 |
| KR | 20120133979 A | 12/2012 |
| KR | 20160065784 A | 6/2016 |

*Primary Examiner* — Patricia I Young
(74) *Attorney, Agent, or Firm* — Harness, Dickey & Pierce, P.L.C.

(57) ABSTRACT

According to one aspect of the present disclosure, an apparatus for taking pictures or videos triggered by pre-selected changes in a user's biorhythms includes a wearable camera for taking one or more picture and/or videos. The wearable camera is configured to be worn by the user. The apparatus also includes at least one processor configured to receive a biorhythm signal indicative of at least one detected biorhythm of a user. The processor is configured to compare the received biorhythm signal to a biorhythm threshold and, in response to the received biorhythm signal exceeding the biorhythm threshold, to simultaneously trigger the wearable camera to take one or more pictures or videos.

20 Claims, 3 Drawing Sheets

METHOD AND SYSTEM FOR GENERATION OF IMAGES BASED ON BIORHYTHMS

CROSS-REFERENCE TO RELATED APPLICATION

This application is a continuation of U.S. patent application Ser. No. 14/996,675 filed Jan. 15, 2016, which is a continuation of U.S. patent application Ser. No. 13/815,321 filed Feb. 20, 2013. The entire disclosures of the above applications are incorporated herein by reference.

FIELD

The present disclosure relates generally to generating images based on biorhythms.

BACKGROUND

This section provides background information related to the present disclosure which is not necessarily prior art.

Currently users of smartphones take pictures on demand based on the actions of the user or after a short delay specified by the user. Said pictures are then transmitted via such means as e-mail, texting, Internet relay chat [IRC], instant messages [IMs], via Facebook, via blog posts, via Twitter, via Pinterest, or by another means to others on social networks. In a conventional social network, a typical user of a smartphone communicates with other such users by providing pictures and video generated by the user on the smartphone. Such pictures and video are then posted to social network websites in a manner that is accessible to other users of said social media websites. For example, a user of a social networking website might post pictures and video taken by said user, showing daily live and special events such as the Super Bowl or a musical concert. The user may also post pictures and videos from their smartphone showing recent acquisitions such as the purchase of a new automobile or TV set. Other users, who have access to the user's posted information, may contact the user to comment or review information about common shared interests or for other reasons.

There is a trend for social networking websites to focus on images as proven by the success of Pinterest.com and many other such websites. There is a need for a way to generate many images from each 24-hour period with minimal user interaction with their smartphone.

A variety of systems and methods may be implemented according to the present disclosure, and they may operate in a variety of environments. Some embodiments of the present disclosure provide systems and methods for communicating images taken by a user's smartphone with the triggering event, i.e., the event that causes the camera in the smartphone to activate, being based on biorhythms instead of active control of the camera by the user. A means to capture moments digitally with minimal user interaction with their smartphone based on biological processes such as increased heart rate, respiration rate, or another means is missing in the current art.

A social network environment provides the opportunity for frequent, automatic notification of changes in the information posted by other users. In one embodiment of the current disclosure, such automatic notification enables the user and those the user has selected to see images triggered by biorhythms on a specific day at a specific time.

A social network environment provides the opportunity to accumulate extensive historical data about users' transmissions of images and videos. In one embodiment of the current disclosure, predictive analytics operations on such historical data from a variety of web-accessible databases enables forecasting of appropriate selections of images and/or videos from a pre-determined array of images and/or videos taken during a particular event or occasion.

Social networks, such as Facebook, Google+, LinkedIn, Yahoo Groups, and Twitter, have rapidly deployed around the world engaging hundreds of millions of users and providing an opportunity for global reach within authenticated social networks. In one embodiment of the present disclosure, image and video distribution is facilitated by storage of images and videos for later transmission to social networks.

Social network providers such as Facebook, Google+, LinkedIn, Twitter, and Yahoo Groups, and Social API have platforms that the present disclosure can utilize. They provide profiles and interest or affinity information about users, a means of forming authenticated communities, and a wealth of historical data on which the communication and analytics engines of the present disclosure can operate. However, there are many critical features of the present disclosure that fall outside their scope, e.g., triggering the capturing of images and videos based on biorhythms.

The purpose of this introduction is to give the reader an overview of the general subject matter of the disclosure. By no means is the disclosure limited to such subject matter or by the illustrative embodiments of the disclosure. These embodiment are mentioned not to limit or define the disclosure, but to provide examples of some embodiments of the disclosure to aid in the understanding thereof. Illustrative embodiments are discussed in the Detailed Description, and further description of the disclosure is provided there. Advantages offered by the various embodiments of the present disclosure may be further understood by examining this specification.

Some or all of the above needs may be addressed by certain embodiments of the disclosure. Certain embodiments of the disclosure may include systems and methods for retaining valuable images until an appropriate event occurs, for instance, retaining an outdoor scene until the intended recipient moves into an appropriate living space that will accommodate a large reproduction of the image. The present disclosure overcomes the limitations of conventional approaches by providing a full range or images and storage until the most appropriate time. Aspects and advantages of the disclosure will be set forth in part in the following description, or may be obvious from the description, or may be learned through practice of the disclosure.

Variations and modifications can be made to these exemplary embodiments of the present disclosure. Other embodiments and aspects of the disclosure are described in detail herein and are considered a part of the claimed disclosure. Such other embodiments and aspects can be understood with reference to the following detailed description, accompanying drawings, and claims.

SUMMARY

This section provides a general summary of the disclosure, and is not a comprehensive disclosure of its full scope of all of its features.

According to one aspect of the present disclosure, an apparatus for taking pictures or videos triggered by pre-selected changes in a user's biorhythms includes a wearable camera for taking one or more picture and/or videos. The wearable camera is configured to be worn by the user. The apparatus also includes at least one processor configured to receive a biorhythm signal indicative of at least one detected biorhythm of a user. The processor is configured to compare the received biorhythm signal to a biorhythm threshold and, in response to the received biorhythm signal exceeding the biorhythm threshold, to simultaneously trigger the wearable camera to take one or more pictures or videos.

According to another aspect of the present disclosure, a computer-implemented method for taking pictures and videos triggered by pre-selected changes in biorhythms is disclosed. The method includes receiving a biorhythm signal indicative of at least one detected biorhythm of a user, and comparing the received biorhythm to a biorhythm threshold. The method also includes, in response to the received biorhythm exceeding the biorhythm threshold, simultaneously triggering a wearable camera to take one or more pictures or videos. The wearable camera is configured to be worn by the user.

According to a further aspect of the present disclosure, an apparatus for taking pictures or videos triggered by pre-selected changes in a user's biorhythms includes a wearable camera for taking one or more pictures and/or videos. The wearable camera is configured to be worn by a user. The wearable camera also includes at least one processor configured to receive a biorhythm signal indicative of at least one biorhythm of the user. The processor is configured to receive a biorhythm threshold from a user, compare the received biorhythm signal to the received biorhythm threshold and, in response to the received biorhythm signal exceeding the biorhythm threshold, to simultaneously trigger the wearable camera to take one or more pictures or videos.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

In a social network, such as an extended family, communications of images, audio files, and videos often take place for holidays, at anniversaries, such as birthdays, special occasions, such as bar mitzvahs or first communions, or on the occasion of milestone events, such as high school or college graduation, the birth of a child, or a promotion or attainment of an achievement award. The present disclosure facilitates such communications at a pre-selected time even when the user of the apparatus and system is asleep.

Figure 1:
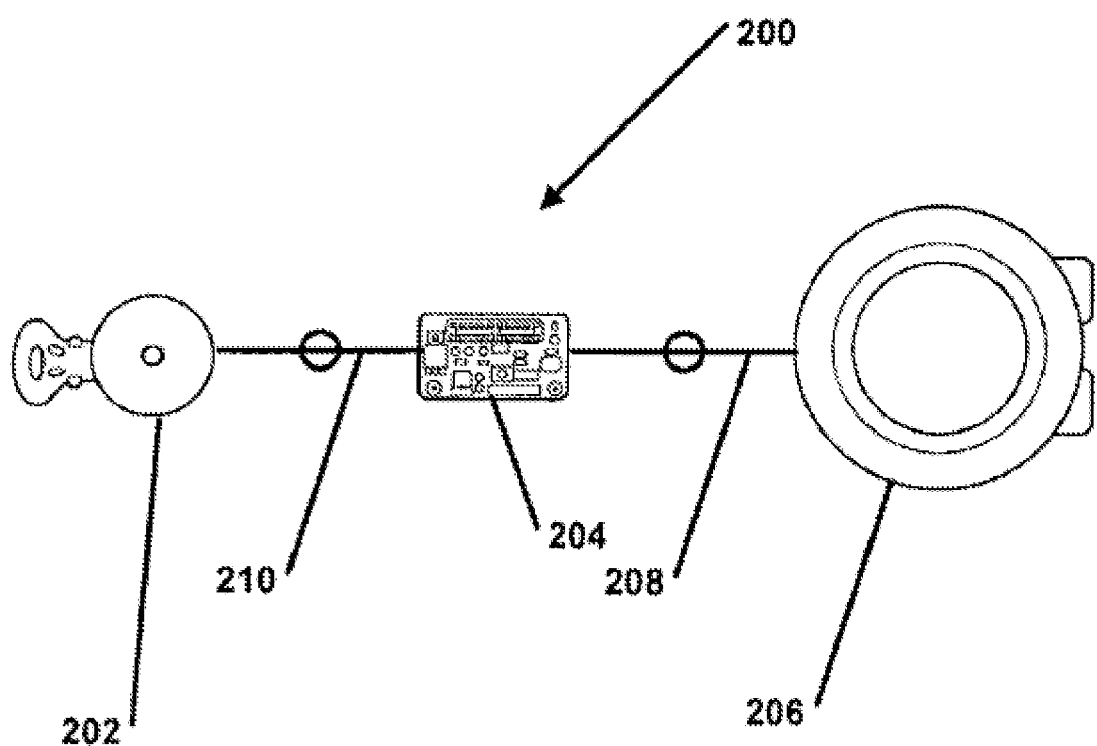
FIG. 1 illustrates an exemplary schematic diagram of an apparatus.

FIG. 1 illustrates an exemplary environment, 200, showing the biorhythm detector. In FIG. 1, the pulse sensor for detecting the user's heart beats per minute, 202, is connected to a processor which contains software code that tracks heart beats per minute, 204, by a wired signal or by a wireless signal or by Bluetooth wireless connection technology or by near field communication, NFC, which is labeled 210. Said processor is connected to a wearable camera, 206, by a wired signal or by a wireless signal or by Bluetooth wireless connection technology or by NFC, labeled 208.

Figure 2:
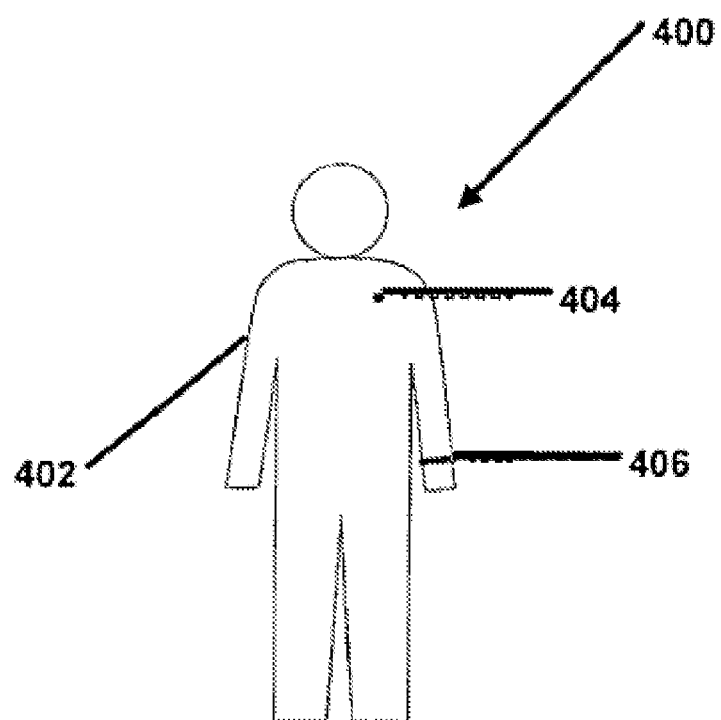
FIG. 2 illustrates an exemplary arrangement of an apparatus on a user's body.

FIG. 2 illustrates an exemplary arrangement, 400, of the apparatus of FIG. 1 on a user's body. In FIG. 2, the user of said apparatus, 402, is wearing a camera for taking photographs or videos, 404. Also shown, 406, is a wristband that houses the processor and pulse sensor of FIG. 1.

Figure 3:
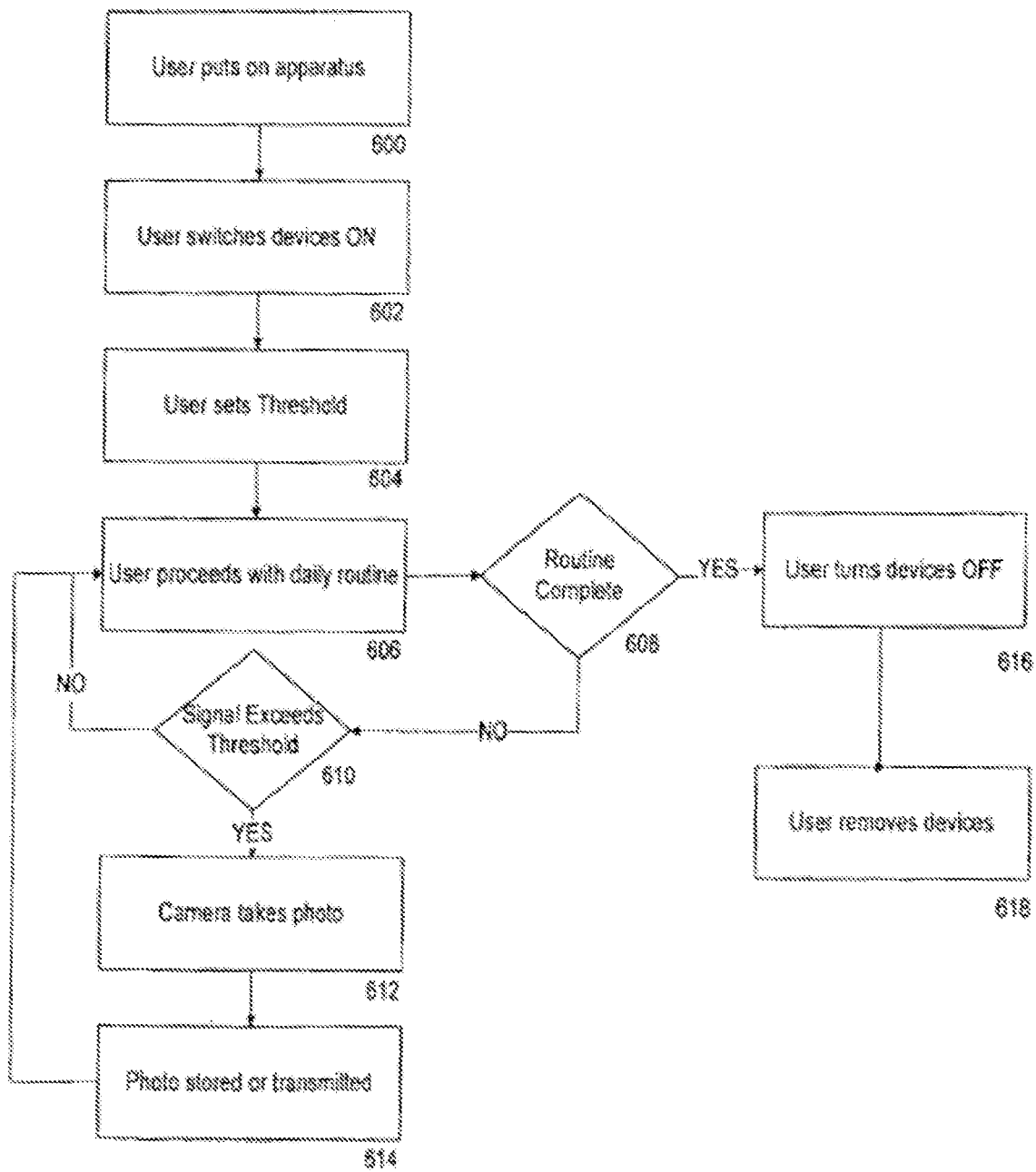
FIG. 3 is an exemplary flowchart of a functional application.

FIG. 3 is an exemplary flowchart of a functional application. In FIG. 3, the user puts on the apparatus, 600, of FIG. 1 and switches said apparatus on, 602, and the user sets the biorhythm threshold at which pictures and/or video will be recorded, 604, then, 606, the user proceeds about their normal routine. At this point if the user is done with their normal routine for the day the user turns the device off, 616. Then the user removes the device, 618. If the biorhythm signal exceeds the pre-selected threshold, 610, while the device is turned on, the camera takes a photo or a video is captured, 612, and then the photo or video is stored or transmitted to a pre-selected person in a social network or a group of such person.

As desired, embodiments of the disclosure may include the biosensors with more or fewer of the components illustrated.

The disclosure is described above with reference to block and flow diagrams of systems, methods, apparatuses, and/or computer program products according to exemplary embodiments of the disclosure. In one embodiment of the disclosure users may access the social network by desktop or laptop computers. In another embodiment users may access the social network by mobile smart phones. In another embodiment of the disclosure users may access the social network by tablet computers or any commercial computing device connected to the Internet. In one embodiment of the disclosure the transmission and storage of captured images, audio files, and videos may be constructed to operate on the Internet independent of existing social networks using technology known to anyone skilled in the art. In another embodiment of the disclosure the transmission of captured media may operate using existing social networks, e.g., Facebook, as platforms using existing application interfaces open to website developers skilled in the art. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosure may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. An apparatus for taking pictures or videos triggered by pre-selected changes in a user's biorhythms, the apparatus comprising: a wearable camera for taking one or more picture and/or videos, the wearable camera configured to be worn by the user; and at least one processor configured to receive a biorhythm signal indicative of at least one detected biorhythm of a user, the processor configured to compare the received biorhythm signal to a biorhythm threshold and, in response to the received biorhythm signal exceeding the biorhythm threshold, to simultaneously trigger the wearable camera to take one or more pictures or videos.

2. The apparatus of claim 1, wherein at least one processor is configured to receive the biorhythm signal from a biosensor via a wireless connection, the wireless connection comprising a Bluetooth wireless connection or a near field communication wireless connection.

3. The apparatus of claim 1, wherein the wearable camera or the at least one processor is configured to transmit the picture(s) or video(s) taken by the wearable camera to a network.

4. The apparatus of claim 1, wherein the at least one processor is configured to simultaneously trigger the wearable camera to take one or more pictures or videos via a wireless signal.

5. The apparatus of claim 1, wherein the biorhythm threshold setting includes a heart rate threshold set by the user.

6. The apparatus of claim 1, wherein the least one processor is configured to receive an input from the user to selectively switch on and switch off triggering of the wearable camera according to the biorhythm signal.

7. The apparatus of claim 6, wherein: when triggering of the wearable camera according to the biorhythm signal is switched on, the at least one processor is configured to simultaneously trigger the wearable camera to take one or more pictures or videos response to the received biorhythm signal exceeding the biorhythm threshold or in response to active control of the wearable camera by the user; and when triggering of the wearable camera according to the biorhythm signal is switched off, the at least one processor is configured to trigger the wearable camera to take one or more pictures or vides only in response to active control of the wearable camera by the user.

8. The apparatus of claim 1, wherein the at least one processor is configured to perform at least one predictive analytics operation to select one or more of multiple images and/or videos taken by the wearable camera.

9. The apparatus or claim 8, wherein the at least one predictive analytics operation includes analyzing historical data from one or more databases including previous images and/or videos transmitted by the user.

10. A computer-implemented method for taking pictures and video triggered by pre-selected changes in biorhythms, the method comprising: receiving a biorhythm signal indicative of at least one detected biorhythm of a user; comparing the received biorhythm to a biorhythm threshold; and in response to the received biorhythm exceeding the biorhythm threshold, simultaneously triggering a wearable camera to take one or more pictures or videos, the wearable camera configured to be worn by the user.

11. The method of claim 10, further comprising receiving the biorhythm threshold as an input from the user.

12. The method of claim 11, wherein the biorhythm threshold setting includes a heart rate threshold set by the user.

13. The method of claim 10, wherein receiving the biorhythm signal includes receiving the biorhythm signal from a biosensor via a wireless connection, the wireless connection comprising a Bluetooth wireless connection or a near field communication wireless connection.

14. The method of claim 10, further comprising transmitting the picture(s) or video(s) taken by the wearable camera to a network.

15. The method of claim 10, wherein triggering the wearable camera includes simultaneously triggering the wearable camera to take one or more pictures or videos via a wireless signal.

16. An apparatus for taking pictures or videos triggered by pre-selected changes in a users biorhythms, the apparatus comprising: a wearable camera for taking one or more pictures and/or videos, the wearable camera configured to be worn by a user; and a processor configured to receive a biorhythm signal indicative of at least one biorhythm of the user; wherein a technical improvement comprises: the processor is configured to receive a biorhythm threshold from a user, compare the received biorhythm signal to the biorhythm threshold and, in response to the received biorhythm signal exceeding the biorhythm threshold, to simultaneously trigger the wearable camera to take one or more pictures or videos.

17. The apparatus of claim 16, wherein the processor is configured to receive the biorhythm signal from a biosensor via a wireless connection, the wireless connection comprising a Bluetooth wireless connection or a near field communication wireless connection.

18. The apparatus of claim 16, wherein the wearable camera or the processor is configured to transmit the picture(s) or video(s) taken by the camera to a network.

19. The apparatus of claim 16, wherein the processor is configured to simultaneously trigger the wearable camera to take one or more pictures or videos via a wireless signal.

20. The apparatus of claim 16, wherein the processor is configured to receive an input from the user to selectively switch on and switch off triggering of the wearable camera according to the biorhythm signal.

* * * * *